(12) United States Patent
Venable

(10) Patent No.: US 6,984,325 B1
(45) Date of Patent: Jan. 10, 2006

(54) WATER AND AQUEOUS MIX TREATMENT USING VENTURI DISCHARGE OXYGEN

(76) Inventor: Robert T. Venable, 600 Luther Dr. #713, Georgetown, TX (US) 78628

( * ) Notice: Subject to any disclaimer, the term of this patent is extended or adjusted under 35 U.S.C. 154(b) by 11 days.

(21) Appl. No.: 10/387,819

(22) Filed: Mar. 12, 2003

Related U.S. Application Data

(60) Provisional application No. 60/371,238, filed on Apr. 9, 2002.

(51) Int. Cl.
*C02F 3/00* (2006.01)
(52) U.S. Cl. .................. 210/621; 210/629; 210/255; 210/220
(58) Field of Classification Search ............ 210/220, 210/621, 629, 255
See application file for complete search history.

(56) References Cited

U.S. PATENT DOCUMENTS

| 5,139,662 A | * | 8/1992 | Ozawa | 210/221.2 |
| 5,314,622 A | * | 5/1994 | Stirling | 210/629 |
| 6,568,900 B2 | * | 5/2003 | Conrad et al. | 415/90 |

* cited by examiner

*Primary Examiner*—Chester T. Barry
(74) *Attorney, Agent, or Firm*—William W. Haefliger

(57) ABSTRACT

The method of treatment of a body or bodies of liquid, that is essentially aqueous, and containing other components, the method including introducing $O_2$ molecules into said liquid body or bodies to increase dispersed or dissolved oxygen content of the liquid, and allowing at least some of the dispersed or dissolved $O_2$ to sink in the body of liquid for retention and treatment of said other components. A submerged venturi is preferably used to entrain air in a stream of such liquid, sub-micron oxygen being formed and dispersed.

6 Claims, 8 Drawing Sheets

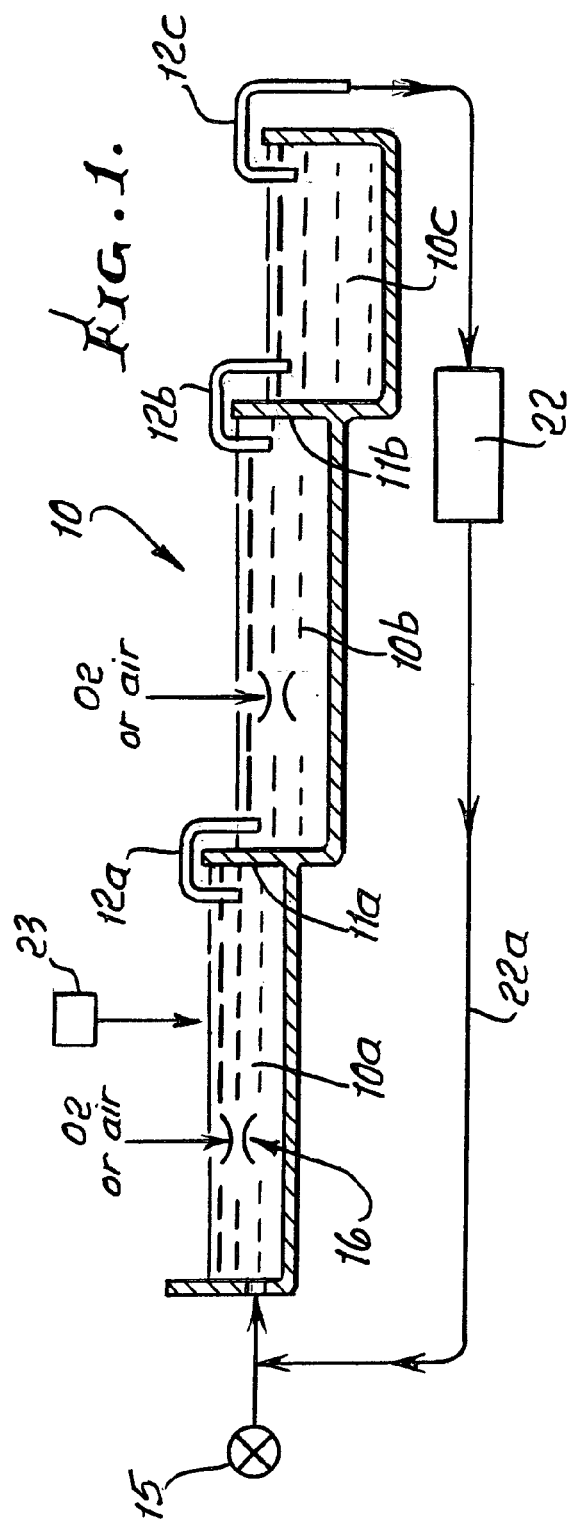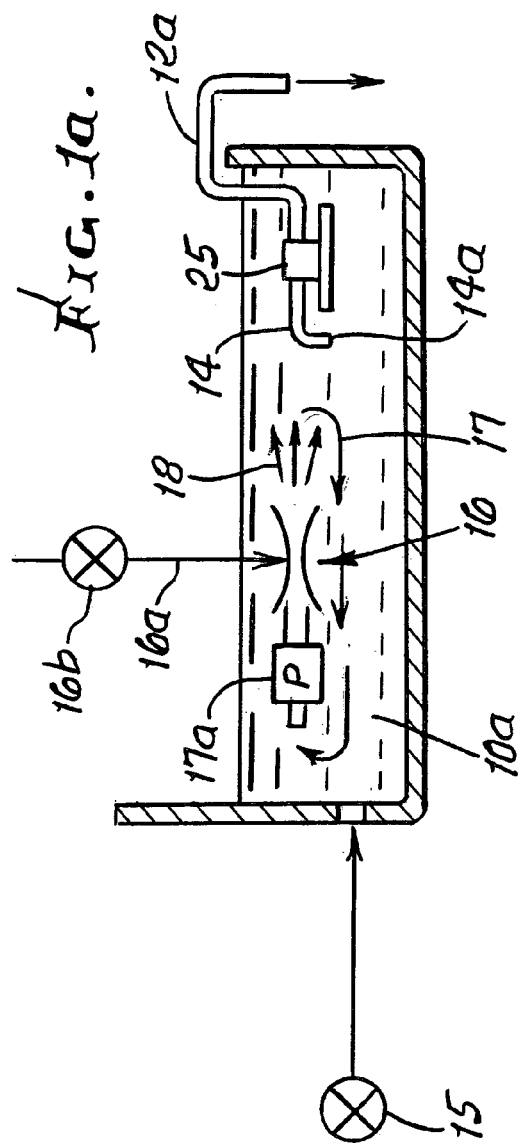

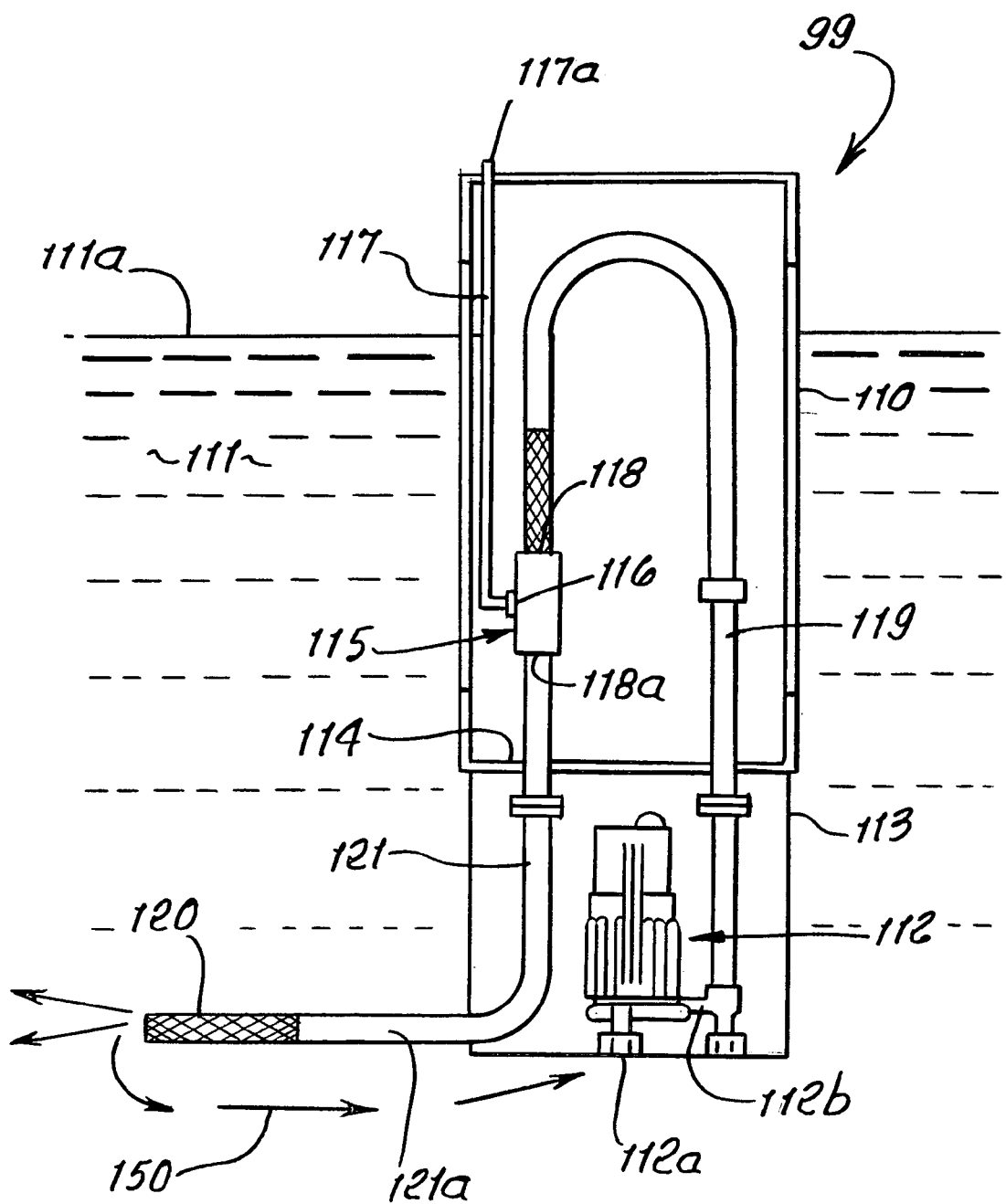

FIG. 5.

Test run of the Digester/Oxygenator at Kingsland Water Supply Corporation
BACKGROUND RUN:

At the Pump:

| Depth | Temperature | %Oxygen Sat. | mg/L Oxygen |
|---|---|---|---|
| 8ft | 16.4 C | 95.1% | 9.40 |
| 7ft | 16.4 C | 95.0% | 9.27 |
| 6ft | 16.4 C | 96.6% | 9.21 |
| 5ft | 16.4 C | 95.5% | 9.36 |
| 4ft | 16.4 C | 95.9% | 9.65 |
| 3ft | 16.4 C | 97.2% | 9.51 |
| 2ft | 16.5 C | 97.4% | 9.52 |
| 1ft | 16.5 C | 97.3% | 9.45 |
| Surface | 16.7 C | 96.9% | 9.38 |

At 130 Degrees from pump:

| Depth | Temperature | % Oxygen Sat. | mg/L Oxygen |
|---|---|---|---|
| 8ft | 16.4 C | 97.3% | 9.50 |
| 7ft | 16.4 C | 96.1% | 9.42 |
| 6ft | 16.4 C | 95.7% | 9.38 |
| 5ft | 16.4 C | 97.0% | 9.47 |
| 4ft | 16.5 C | 97.0% | 9.46 |
| 3ft | 16.6 C | 97.8% | 9.51 |
| 2ft | 16.6 C | 98.0% | 9.55 |
| 1ft | 16.6 C | 97.8% | 9.50 |
| Surface | 16.6 C | 97.9% | 9.52 |

At 30 Degrees behind pump:

| Depth | Temperature | % Oxygen Sat. | mg/L Oxygen |
|---|---|---|---|
| 8ft | 16.4 C | 96.1% | 9.19 |
| 7ft | 16.4 C | 96.1% | 9.20 |
| 6ft | 16.4 C | 96.4% | 9.39 |
| 5ft | 16.4 C | 96.4% | 9.40 |
| 4ft | 16.5 C | 96.1% | 9.38 |
| 3ft | 16.5 C | 97.0% | 9.48 |
| 2ft | 16.5 C | 97.4% | 9.51 |
| 1ft | 16.5 C | 97.9% | 9.55 |
| Surface | 16.6 C | 97.6% | 9.51 |

FIG. 6.

After a pump run of two hour and ten minutes the following readings were made at the pump discharge:

| Depth   | Temperature | % Oxygen Sat. | mg/L Oxygen |
|---------|-------------|---------------|-------------|
| 8ft     | 16.6C       | 102.8%        | 9.92        |
| 7ft     | "           | 102.9%        | 10.20       |
| 6ft     | "           | 101.8%        | 9.92        |
| 5ft     | "           | 101.9%        | 9.86        |
| 4ft     | "           | 102.7%        | 9.84        |
| 3ft     | "           | 103.4%        | 9.94        |
| 2ft     | "           | 103.2%        | 9.98        |
| 1ft     | "           | 102.9%        | 9.75        |
| Surface | "           | 104.3%        | 10.71       |

At 13p0 degrees from the pump:

| Depth   | Temperature | % Oxygen Sat. | mg/L Oxygen |
|---------|-------------|---------------|-------------|
| 8ft     | 16.6C       | 103.7%        | 10.07       |
| 7ft     | "           | 103.6%        | 10.02       |
| 6ft     | "           | 103.5%        | 10.00       |
| 5ft     | "           | 103.6%        | 9.99        |
| 4ft     | "           | 103.1%        | 10.01       |
| 3ft     | "           | 103.0%        | 9.91        |
| 2ft     | "           | 104.1%        | 10.11       |
| 1ft     | "           | 105.1%        | 10.16       |
| Surface | "           | 105.0%        | 10.10       |

At 30 degrees behind the pump:

| Depth   | Temperature | % Oxygen Sat. | mg/L Oxygen |
|---------|-------------|---------------|-------------|
| 8ft     | 16.6C       | 102.3%        | 9.94        |
| 7ft     | "           | 101.8%        | 9.87        |
| 6ft     | "           | 100.5%        | 9.79        |
| 5ft     | "           | 100.5%        | 9.79        |
| 4ft     | "           | 101.2%        | 9.84        |
| 3ft     | "           | 101.8%        | 9.96        |
| 2ft     | "           | 102.0%        | 9.95        |
| 1ft     | "           | 102.5%        | 9.95        |
| Surface | "           | 102.0%        | 9.92        |

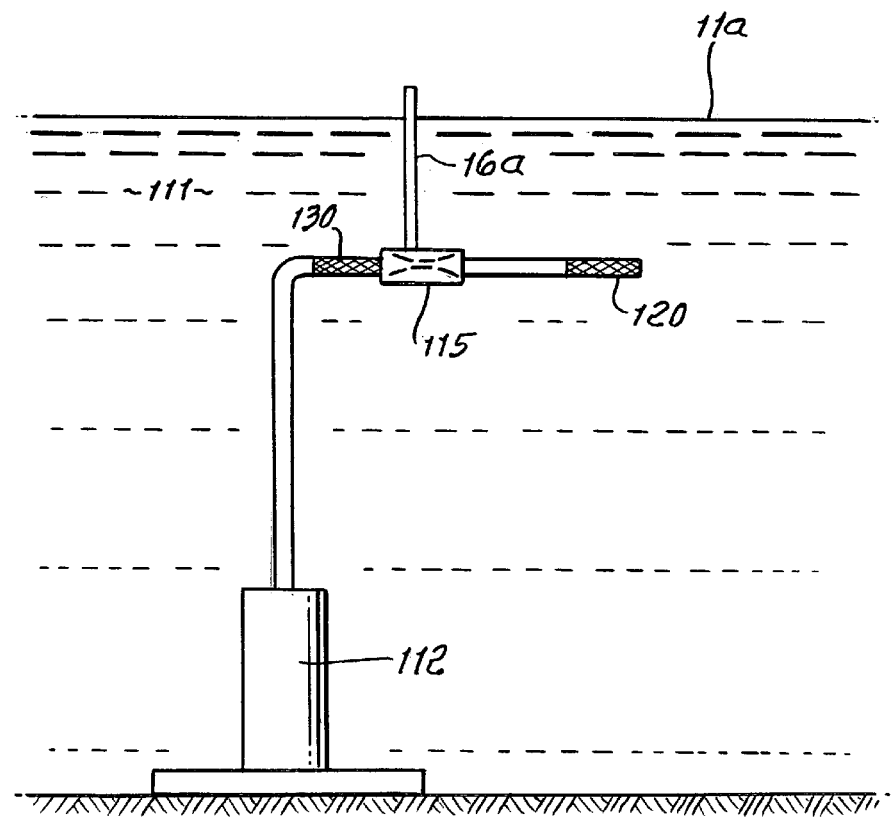

WATER AND AQUEOUS MIX TREATMENT USING VENTURI DISCHARGE OXYGEN

FIELD OF THE INVENTION

This application claims priority from provisional application Ser. No. 60/371,238, filed Apr. 9, 2002.

The present invention relates to the field of oxygen treatment of liquids. It more particularly relates to physical removal or treatment of unwanted components from aqueous liquids or mixtures using dispersed molecular oxygen.

BACKGROUND OF THE INVENTION

There is need for improvements in processes which are intended to physically treat aqueous mixtures, in liquid form or in manipulable or deformable state. Examples include animal waste in aqueous liquid lagoons or ponds, or water treated particulate such as clay particles used to produce bricks, or cementitious mixes to produce mortar, or concrete, or sewage, or other aqueous mixtures. There is also need for improvements in oxygen treatment of such aqueous mixtures.

SUMMARY OF THE INVENTION

It is a major object of the invention to provide an improved process or processes meeting the above needs. Basically, the improved method of treatment of a body or bodies of liquid, that includes
  a) the body or bodies of liquid is essentially aqueous, and contains other components, as in mixture form,
  b) introducing $O_2$ molecules into said liquid body or bodies to increase dispersed or dissolved oxygen content of the liquid,
  c) and allowing at least some of the dispersed or dissolved $O_2$ to sink in the body of liquid for treating said other components.

In this regard, the sub-micron oxygen treatment of the mixture is effected so as to result in prolonged oxygen retention in the mixture, i.e. escape of oxygen from the mixture, such as a liquid mixture, is retarded for days, to enhance oxygen treatment of the mixture components. Such components may for example include one or more of the following:
  i) animal waste
  ii) cementitious mortar
  iii) sand
  iv) concrete ingredients
  v) clay articles as used in production of bricks
  vi) sewage
  vii) contaminant, in large water bodies
  viii) contaminants in agricultural irrigation waste
  ix) animal waste
  x) dead zones in harbors, deltas, and salt water zones
  xi) aquaculture In regard to the above, it is found that the dissolved or dispersed oxygen as used in such treatment in aqueous mixtures tends to descend or sink toward the bottom of the mixture, over time.

The air entrained by a submerged enhanced venturi forms the desired sub-micron size oxygen particles, referred to as oxygen containing cycloid particles, in situ, that do not rapidly dissipate or rise to the aqueous mixture surface, as would a bubble. The sub-micron particles are typically about 5 to 10 Angstroms in cross dimension, and invisible, and they migrate toward the bottom of the aqueous mixture, or aqueous pool, and for remain divided for considerable periods of time, for example up to about 30 days. Thus the venturi forms the entrained sub-micron size particles in a liquid stream discharge that is not exposed to atmosphere, and dispurses them in the body of liquid, for retention and in positions to treat the liquid throughout its extent, the high velocity discharge of the venturi assuring wide distribution in the body.

An added object is to separate an upper portion of said body of liquid from a lower portion of said body of liquid into which $O_2$ molecules have been dispersed or dissolved.

A further object is to provide for interconnection, for example sequential, of multiple bodies of the liquid or liquid mix, to allow flow of liquid between the bodies of liquid, such as may collect in lagoons. A gravimetric overflow line or lines may be employed to establish the interconnections; and liquid may be caused to flow through that line as by establishing an hydraulic head. A pump can be employed to induce such flow.

A yet further object is to inject into the body of liquid or liquid mix a high velocity stream of liquid containing entrained air from which sub-micron sub-oxygen separates to treat the liquid or mix, as referred to. The stream may be caused to pass through an enhanced venturi device, to entrain air, and from which the stream carrying the oxygen in sub-micron bubble OCCP size is widely diffused into the body of liquid to be treated.

Another object is to provide a method to treat contaminant, using microbubbles of $O_2$; the contaminant may include hydrocarbon, sewage or chemicals. The contaminant may be in a pool of liquid, or underground, or in a pile of equipment or tailings.

Apparatus embodying the invention includes means for supplying and introducing oxygen molecules into a body of liquid, as referred to, in a manner to result in formation of sub-micron oxygen "particulate" or bubbles to remain dissolved in the liquid and to descend toward the bottom of the liquid, such as a liquid mix, for extended time treatment of liquid body components. Means may also be provided to separate an upper portion of said body of liquid from a lower portion of said body of liquid into which $O_2$ molecules have been dispersed or dissolved.

These and other objects and advantages of the invention, as well as the details of an illustrative embodiment, will be more fully understood from the following specification and drawings, in which:

DRAWING DESCRIPTION

FIG. 1 is an elevation showing a multiple liquid body or lagoon system embodying treatment in accordance with the invention;

FIG. 1a is an elevation showing a single liquid body being treated in accordance with the invention;

FIG. 4 is a schematic showing a venturi, pump and flotation body assembly;

FIG. 5 is a test example;

FIG. 6 is a test example;

FIG. 7 shows an installation of equipment in a water body such as a lake;

DETAILED DESCRIPTION

Figure 2:
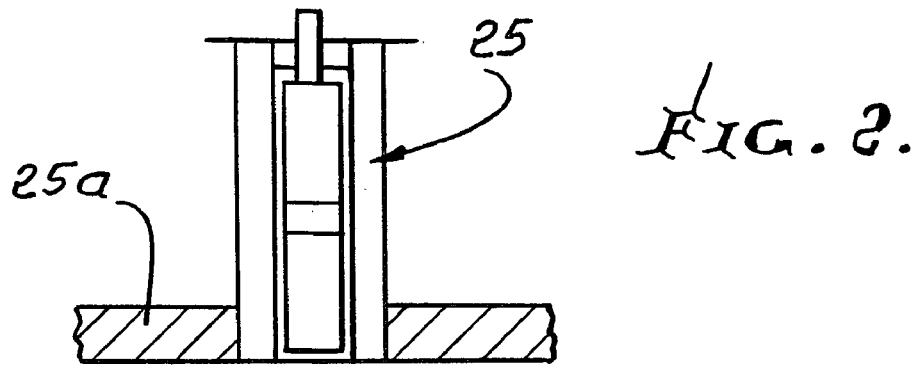
FIG. 2 is a diagram showing use of a pump.

By way of example the invention will first be described in relation to treatment of animal waste, although other uses of the invention are contemplated, as described and claimed herein.

Anaerobic treatment methods have been employed whereby the animal waste is placed in a pond for allowing the anaerobic, or septic, process to begin. Even when effective, this method produces abundant bad odors. Odor is a common complaint lodged against anaerobic processes.

Alternatively the waste can be spread on open fields in order to simultaneously dispose of the waste and fertilize the ground. Unfortunately, the waste products are not uncommonly washed into nearby bodies of water, runoffs, and/or ditches, creating new problems. Odor, again, is a problem. Composting presents yet another option. However, in the usual case, the volume of waste that must be treated in commercial installations makes this option unattractive. Odor is again a problem.

Referring to FIG. 1, and as a solution to these problems, a lagoon 10 is divided into a series of three adjacent treatment zones 10a, 10b and 10c through the use of two separative dams 11a and 11b. The treatment zones are fluidly inter-connected in series through the use of gravimetric overflow lines 12a and 12b. The second treatment zone lob is connected to the first treatment zone 10a by means of such a line 12a, and the third treatment zone 10c is connected to the second treatment zone 10b by a similar line 12b. Although a gravimetric line is disclosed by which means fluid flows from one treatment zone to another by virtue of siphoning or by hydraulic head, a line connecting two adjacent treatment zones by a pump means 25 to transfer fluid is also usable. Pump intake is from a line 14 having an inlet 14a is shown in FIG. 1a.

Animal waste can be introduced to zone 10a as via a control valve 15, or by other means.

The lagoon water in each treatment zone is treated by injecting into the treatment portion a high-velocity stream of lagoon water containing sub-micron size oxygen. See FIG. 1a for example showing a submerged venturi 16 in a recirculation path 17 that may include a pump 17a. That high velocity stream or segment of water discharges, by diffusing at 18, into the lagoon body 10a, a plurality of entrained microbubbles which comprise oxygen. The term "microbubble" is used to denote OCCP that are so small as to be practically invisible to the naked eye, and which are or become divided into and sink in the lagoon water for prolonged retention to treat the water contents. The lagoon water stream is thereby injected in situ, with a venturi device for example at over 20 psi pressure, and with a high velocity created by the venturi device, to impart a vigorous mixing within the lagoon treatment zone, which itself is a standing body. The diffuser nozzle discharge stream can in part be continuously recirculated, to ensure that, as a result of the high velocity mixing, all of the water in the lagoon treatment zone is thoroughly and efficiently treated with a high-energy infusion of OCCP, which sinks in the water body. Air enters the enhanced venturi throat via a pipe 16a controlled by a valve 16b.

This process is repeated at zones 10b and 10c in FIG. 1.

The effluent withdrawn from the third treatment portion 10c (or, alternatively, from the final treatment portion if more than three stages are utilized) may be further treated (e.g., with chlorine) if desired, and used in its current state, or otherwise processed to waste. The process results in very low odor, a significant advantage to the owner of the facility and to the surrounding community.

The relatively clear nature of the effluent at from the third treatment portion makes it possible to use that water as at 22, for livestock, for cleaning a milking barn or pig pens, or for other purposes, with some or all of the waste from washdowns optionally being fed back at 22a into the first treatment zone 10a. Water wells can be used as at 23 to replenish one or more of the treatment portions should there be a dry period.

Figure 3:
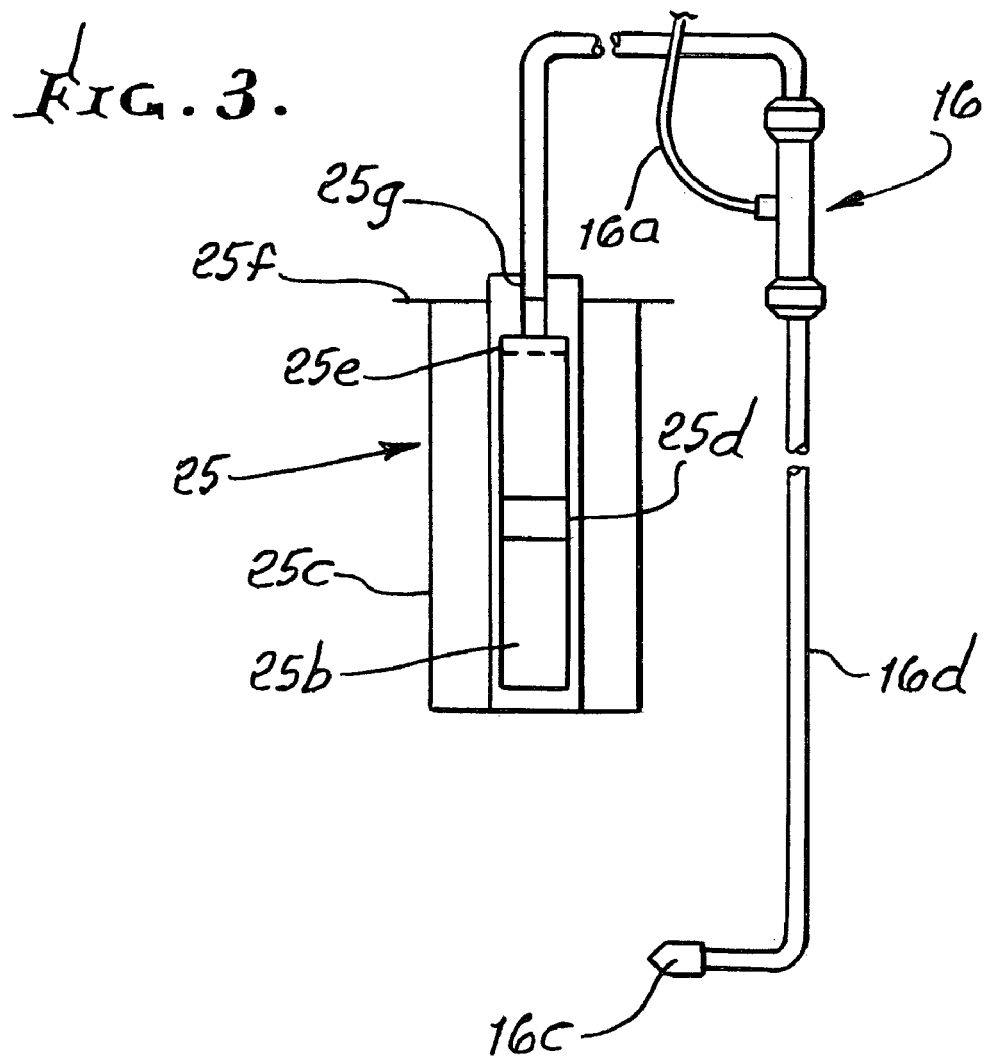
FIG. 3 is a diagram showing a pump connection to a venturi.

As indicated in FIG. 1a a submersible effluent pump 25 is usable for continuous operation and may be positioned within each treatment portion. The pump may be mounted on a float device 25a or at or near the bottom of the animal waste lagoon. See FIGS. 2 and 3. Pump elements appear at 25b–25g. It may be run on any convenient and effective voltage. FIG. 3 also shows an enhanced venturi discharge nozzle 16c on a duct 16d that can be directed to different parts of the lagoon.

Air may be injected into the stream of water or into the lagoon water to distribute OCCP therein. Preferably, it is injected into the stream by means of the described device producing extremely small OCCP as referred to. The OCCP can be further split by the venturi enhanced discharge nozzle to create even smaller OCCP, which also sinks in the lagoon.

The high velocity current created spreads the OCCP (and, it is believed, the oxygenated/aerobic bacteria) throughout a large area of each lagoon treatment portion, supplying oxygen and aerobic bacteria to all points horizontally, vertically and laterally, and the OCCP produced hovers or sinks to treat waste material at every depth. A small percentage of the OCCP are large enough, and thus contain more hydrogen, to sink slower from the surface, supplying all levels of the lagoon with oxygen (OCCP) (and, it is believed, aerobic bacteria).

FIG. 4 shows a compact assembly 99 that includes:
a) a flotation body or housing 110 adapted for reception in an aqueous body 111, to float therein;
b) a pump 112 in a housing 113 attached to or carried by 110 below end cap 114;
c) a venturi 115 extending vertically within body or housing 110, the venturi having a throat entrance at 116 for air received from duct 117 that extends upwardly to its inlet 117a above surface 111a;
d) the pump having a submerged inlet 112a fed from body 111, and an outlet 112b to deliver pressurized aqueous liquid to the venturi end inlet 118 via line 119;
e) and a nozzle 120 coupled to the venturi outlet 118a via a duct 121, which may be flexible at 121a to distribute sub-micron size oxygen bubbles (OCCP) from the venturi, for wide distribution in the water body 111.

FIGS. 5 and 6 summarize the results of experiments run utilizing the claimed invention on water in a single, unpartitioned tank at municipal water firm.

TEST RESULTS

The columns of numbers in FIG. 5 represent the amount of mg/L (milligrams per liter) in the fourth column, and the percentage of oxygen saturation in the third columns. The first sheet is the background run which is tested as the existing condition so that a comparison may be run after the test. The tank in question is 35,000 gallons. Seven feet of water and the surface were tested at each level with a hand held oxygen meter. When all background tests were done, the apparatus was run for about 2 hours.

The apparatus continued running with the directional nozzle that creates a current. On the actual test the temperature was equalized and gave uniform $O_2$ saturation and $O_2$ mg/L with a gradual increase $O_2$ data. The final results in all three segments of the tank and at every foot of depth shows a minimum of 101.8 saturation in locations #1 and #2. The minimum $O_2$ saturation in the #3 location was 103.0. This simply means that the tank had remarkable levels of saturation in all the fluid in the tank.

The wastewater submersible device takes water from the vessel, pond, stream or lake, etc., in which it is installed, pumps through the venturi/injector in the discharge pipe and on out through the enhanced nozzle at the end of the discharge pipe. The combination of the venturi injection of air and the (pump discharge) enhanced nozzle reduces the sizes of the individual bubbles to a size so small that it cannot be seen, and results in bubbles that either hover or sink to the bottom. About 20% of the venturi discharge bubbles are about the size of a small match head and these rise, i.e. go upward. The other 80% either hover or sink. The horizontal nozzle arrangement creates a current that extends further and further over an acre or more of the aqueous liquid body. As long as there is animal waste in the lagoon, and as long as there is oxygen in the bubbles, the aerobic bacteria enclosed in or by those bubbles will continue to multiply in a feeding frenzy. The apparatus re-supplies oxygen and aerobic bacteria constantly.

Since the process is aerobic (with air) instead of anaerobic (without air), there is no odor. Sewage will be processed to clean, clear water. Any incoming sewage or effluent will be quickly treated. The water in this treatment can be recycled totally. It may be used to water livestock, wash animal facilities, etc. A typical pump power requirement is 115VAC or 230VAC. The amperage used for operation is 2 amps for 230VAC and 4 amps for 115VAC, in the test.

FIG. 7 is a schematic diagram showing an arrangement in which the mixing assembly is located on the lagoon bottom with a vacuum tube 16a extending to a point above the surface 11a of the water.

Figure 8:
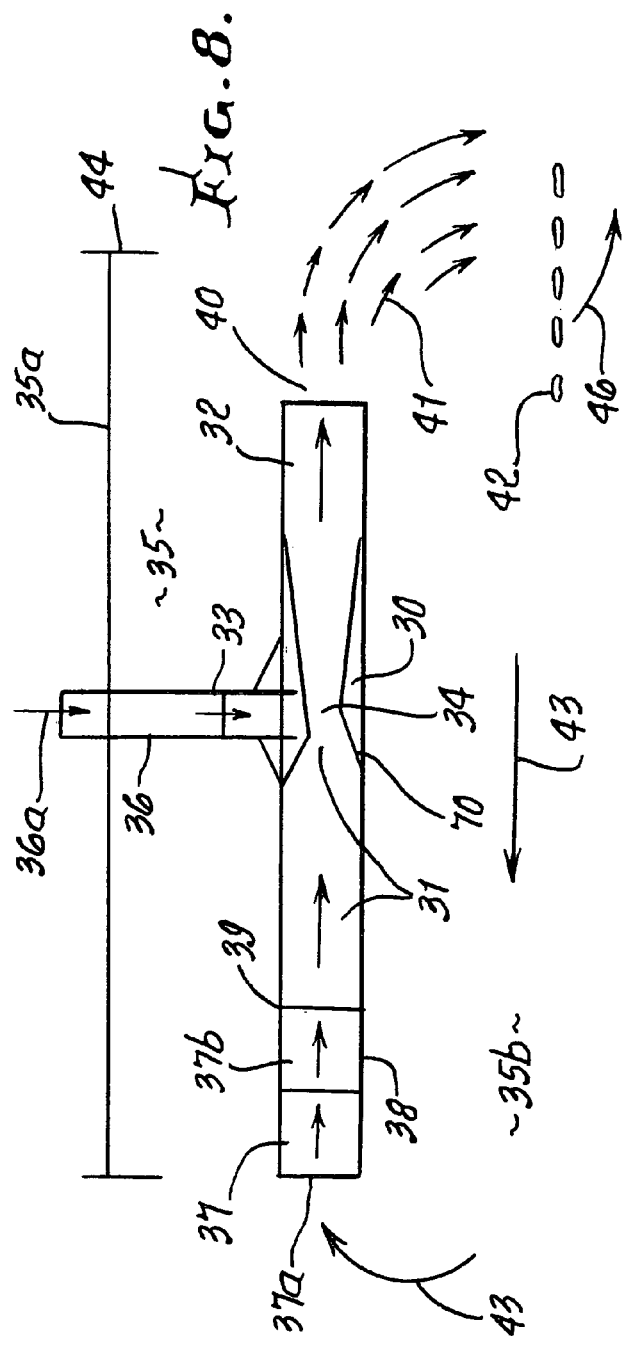
FIG. 8 is a view of an enhanced venturi operating to produce sub-micron bubbles or particulate.

FIG. 8 shows a submerged venturi 30 having an entrance 31, enhanced discharge at 32, and an air inlet 33 at venturi narrowed cross-section throat 34. The venturi is preferably submerged in a liquid body 35, and supported at 70 (for example a float) below surface 35a, but above the lower regions 35b of body 35. Air is delivered to inlet 33 as via a vacuum pipe 36 having an air inlet 36a above surface 35a.

A liquid pump 37 has an inlet 37a, and an outlet 37b, from which pressurized liquid flows via pipe section 38 to the enhanced venturi entrance 31. The pipe may be solvent welded, threaded or bolted at 39 to the venturi.

The claimed invention operates to entrain air flowing via inlet 33 to the enhanced venturi throat 34, for diffused delivery via discharge at 32 to the body of aqueous liquid 35, as indicated at 40. Sub micron oxygen (OCCP) bubbles are formed and sink in the liquid body 35, as indicated at 41. Such bubbles have size between about 5 to 10 Angstrom, in cross section. In an example, the pump outlet pressure is between 35 and 45 psi, and the venturi throat cross section is about ½ to ¾ inches in diameter. FIG. 8 also shows recirculation at 43 of some liquid delivered at 40, to the pump inlet 37a. In FIG. 4, see recirculation path at 130. That inlet may be positioned close to zone 40; and enhanced production of the sub-micron size oxygen (OCCP) bubbles is thereby achieved. Such bubbles, after sinking to lower zone 41, are retained at that level to treat liquid waste or other components 42 that may settle to that zone. Liquid to be treated is shown as delivered at 43 to the body 35; and oxygen treated liquid may be withdrawn at 44 from upper level 35a of the body. Treated components 42 may be withdrawn at 46 from the lower zone 41.

Nitrogen and other gases in the entrained air separate and escape from the body 35.

Water passed through the enhanced venturi, and containing entrained sub-micron oxygen microbubbles, OCCP, can be used in processes such as brick-making, to enhance brick strength. For example, such water may be added to clay particulate to form a highly viscous mix, which is extruded and cut into brick shapes. Similarly, mortar or aqueous cementitious mixes can be formed using such water, to form high strength concrete. Such water can be used to treat other molecules or components, as referred to above.

Figure 9:
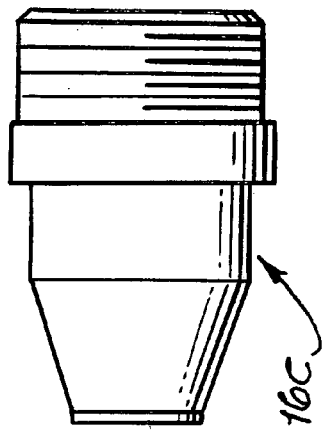
FIG. 9 is a view of a nozzle to be used with an enhanded venturi.
Figure 10:
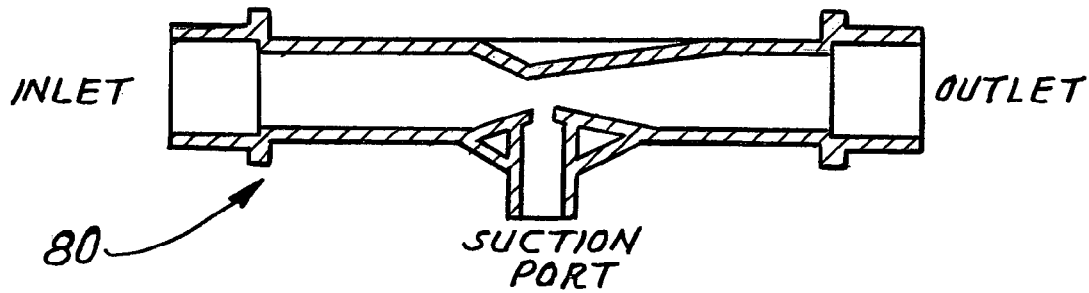
FIG. 10 is another view of a usable venturi.

FIG. 9 shows details of nozzle 16c; and FIG. 10 shows an alternate form of an injector venturi 80.

Figure 11:
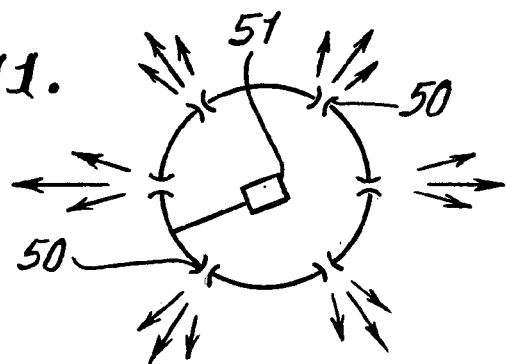
FIG. 11 show use of multiple sub-merged venturi's, in a water body.

FIG. 11 shows, in plan view, multiple sub-merged venturis 50, as described, to which pressurized liquid from lagoon 51 is delivered via a manifold 52. Extensive treatment of the lagoon is thereby achieved.

The concrete industry can be benefit greatly from the present process of oxygen treatment, since the dissolved oxygen only slowly decays, and since voids are produced in the liquid or water. Such voids entrain air in the concrete. Because of their slow decay rate, water can be stored for several days to provide the proper amount of voids. These voids make concrete especially resistant to temperature changes and also gives concrete more strength.

The process can also be employed in brick making, wherein clay particulate is mixed with water containing such sub-micron size oxygen bubbles, OCCP, or "particles" produce an extrudible mass formed into brick shape. Brick strength can be increased up to 50%, after curing.

Municipal sewage treatment plants can save on processing using the present process, because the OCCPs go to the bottom of the liquid zone where sludge is normally formed. At the present time, the only way to remove this sludge is to isolate and dry it, then load it on trucks and haul it away. Fuel bills would shrink considerably because of lack of need for massive machinery to keep the vessel bottom sludge contents stirred up. The present process takes the (OCCP) to the bottom of the vessel to process the sludge where it is.

Rivers, lakes, marshlands and other bodies of water can also be treated. Oxygen retention and accumulation enables treatment of 1-acre lake with a small venturi, with ½ h.p. pump 37 motor input. The longer it runs, the more oxygen is retained. Rivers, with their natural currents, can be serviced from installations on or near the banks. Industry users of oxygen can supply oxygen as described herein in many processes. Reverse osmosis will provide more water, more economically with salt water treated as described.

Municipal water works can save money and extend the life of their present water plants by pre-treating the raw water, as described herein to remove metals and other minerals. The retention and accumulation of dissolved oxygen cuts costs.

Agricultural irrigation water can be treated for greater yields. Large amounts of dissolved oxygen can be placed in lakes or reservoirs. Cost is low because the oxygen is evenly distributed throughout the water, bottom to top. Agricultural residues can also be cleaned up. An anaerobic condition changes to aerobic and odor problems cease.

Dead zones in harbors, deltas and salt water sites can be treated using the process.

The present process makes it possible to place oxygen where needed in aqueous bodies or mixes and keep it there for long periods of time, with low power costs compared to other methods.

Figure 12:
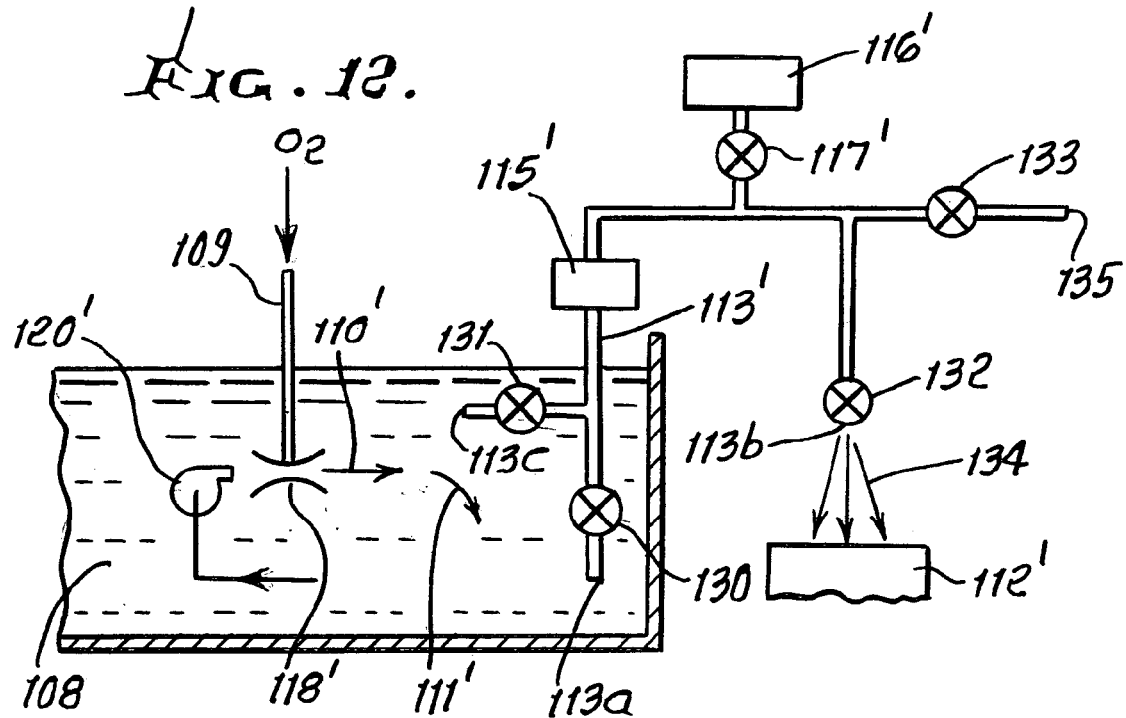
FIG. 12 is a view showing use of microbubbles in treating a zone containing contaminant; and with optional use of microbes.

In FIG. 12, oxygen, as in air, is entrained at 109 in a stream 110' of liquid, to produce $O_2$ microbubbles tending to sink at 111' in a pool of 108 liquid, water being an example. A contaminant to be treated as by contact with the microbubles (to decrease contamination) is indicated at 112'. The microbubbles may be delivered to the contaminant, as for example by duct 113' having an entrance 113a in pool 108, and extending to deliver microbubbles (in liquid 110') at duct outlet 113b, to the contaminant. A pump 115' may be used in duct 113. Additional treatment material or liquid may be supplied at 116' to flow into duct 113' for entrainment, as may be controlled by valve 117'. A bubble producing venturi is shown at 118', in pool 108, which may be aqueous. A flow enhancer pump is shown at 120', as before.

Contaminant 112' may for example be in a pool of liquid, or may be on dry ground or underground, as for example hydrocarbon in the earth near an oil or gas well, or near a storage tank. The contaminant may be other chemicals, or sewage, or contaminated and rejected equipment as in a pile. Other types of $O_2$ microbubble treatable contaminants are contemplated, for example mine tailings.

Optional valves are indicated at 130–133. If valve 131 is closed and valve 130 open, more highly concentrated microbubbles are delivered at 134, if valve 133 is closed and valve 132 open; or are delivered at 135 if valve 132 is closed and valve 133 open. And, if valve 131 is open and valve 130 closed less highly concentrated microbubbles are taken into line 113 at 113c, for delivery to 134 or 135.

The added treatment material 116 may comprise microbes, bacteria, chemicals, or other substances, tending to degrade the contaminant. Such material may be added to the flow, as via the venturi 118', or an additional venturi in the pool 108. The contaminant may be in the pool (for example oil in water) and may be treated by microbubbles, with or without microbes, discharged or fed into the pool.

I claim:

1. Apparatus for treating a body or bodies of aqueous liquid, that comprises
   a) means providing molecular oxygen,
   b) means for introducing said molecular oxygen into said body or bodies of aqueous liquid to increase dissolved oxygen content of the liquid and to disperse said dissolved oxygen content widely in said liquid,
   c) whereby at least some of the dissolved oxygen content sinks in said body or bodies of liquid and is retained therein for treating said liquid or substance therein,
   d) said means including an enhanced venturi operating to recirculate liquid in said body or bodies at the same time that molecular oxygen is dispersed via the enhanced venturi into said body or bodies,
   e) there being:
      i) a flotation body housing received in said aqueous body, to float therein;
      ii) a pump in the housing,
      iii) said venturi supported within and extending substantially vertically within said housing, the venturi having a throat entrance for air received from a duct that extends upwardly to its inlet above the aqueous body surface,
      iv) the pump having a submerged inlet fed from said body, and an outlet to deliver pressurized aqueous liquid to the venturi inlet via a line;
      v) and an elongated nozzle coupled to a venturi outlet via a second duct configured to distribute sub-micron size oxygen bubbles from the venturi, for wide distribution in the water body via the nozzle which projects from the body.

2. The apparatus of claim 1 wherein said enhanced venturi is submerged in said liquid, via said housing.

3. The apparatus of claim 1 including gravimetric flow lines interconnecting said liquid bodies, the housing movable between said liquid bodies.

4. The apparatus of claim 1 wherein said means includes multiple venturis, respectively associated with multiple of said liquid bodies, each venturi operating to circulate liquid in said body or bodies at the same time that molecular oxygen is dispersed via the enhanced venturis into said liquid body or bodies.

5. Apparatus as defined in claim 1 wherein the dissolved oxygen is between about 5 and 10 Angstroms in cross dimension.

6. An animal waste lagoon treatment process employing the apparatus of claim 1 comprising the following steps:
   a) separating the animal waste lagoon, said animal waste lagoon comprising lagoon water and animal waste, into a first treatment portion, a second treatment portion, and a third treatment portion, said second treatment portion adjacent to said first treatment portion and said third treatment portion adjacent to said second treatment portion,
   b) connecting said second treatment portion to said first treatment portion by means of a first gravimetric overflow line and said third treatment portion to said second treatment portion by means of a second gravimetric overflow line,
   c) injecting via said apparatus into each of said first treatment portion, said second treatment portion, and said third treatment portion a recirculating high-velocity stream of lagoon water, said recirculating stream comprising a plurality of entrained microbubbles comprising oxygen and said stream vigorously mixing the lagoon water in said treatment portion; and
   d) withdrawing from said third treatment portion a treated stream of lagoon water.

* * * * *